United States Patent [19]

Rafferty

[11] Patent Number: 5,222,760
[45] Date of Patent: Jun. 29, 1993

[54] DECORATIVE PANEL WITH INVISIBLE TEAR SEAM

[75] Inventor: Scott Rafferty, Dover, N.H.

[73] Assignee: Davidson Textron Inc., Dover, N.H.

[21] Appl. No.: 623,694

[22] Filed: Dec. 7, 1990

[51] Int. Cl.⁵ .................. B60R 21/04; B60R 21/16
[52] U.S. Cl. .................................. 280/728; 280/751
[58] Field of Search .............. 280/728, 730, 731, 732, 280/736, 740, 741, 743, 752, 751, 728 B

[56] References Cited

U.S. PATENT DOCUMENTS

| | | | |
|---|---|---|---|
| 3,756,617 | 9/1973 | Brown | 280/732 |
| 4,246,213 | 1/1981 | Takamatsu | 280/728 |
| 4,842,300 | 6/1989 | Ziomek | 280/732 |
| 4,925,209 | 5/1990 | Sakurai | 280/728 |
| 5,082,310 | 1/1992 | Bauer | 280/732 |

FOREIGN PATENT DOCUMENTS

| | | | |
|---|---|---|---|
| 408064 | 1/1991 | European Pat. Off. | 280/743 |
| 1-122754 | 5/1989 | Japan | 280/743 |

*Primary Examiner*—Karin L. Tyson
*Attorney, Agent, or Firm*—Reising, Ethington, Barnard, Perry & Milton

[57] ABSTRACT

A passenger vehicle has a dashboard having a decorative panel for covering an air bag assembly installation and enable deployment outwardly of the panel upon inflation. The panel comprises a thermoplastic inner support layer having discrete surfaces abutting each other along a predetermined H-shaped tear seam line partially framing the opening to define a door in the panel and a flexible vinyl outer skin layer presenting a smooth outer surface and having a weakened section on its inner surface forming the seam line. An intermediate resilient olefin foam layer or a polyurethane foam layer of equivalent strength having discrete surfaces abutting each other along the seam line completely fills the void between the inner and outer layers and is adhesively bonded to the inner and outer layers. The outer skin along the tear seam line is fractured by inflation of the air bag to break the loose to pivot open about a hinge line extending between the ends of the seam line to enable deployment of the air bag outwardly of the panel.

12 Claims, 2 Drawing Sheets

DECORATIVE PANEL WITH INVISIBLE TEAR SEAM

FIELD OF THE INVENTION

This invention relates generally to vehicle decorative panels for concealing an air bag located in a storage compartment and, more particularly, to a door covering the compartment defined by an invisible tear seam line in the panel outer surface.

BACKGROUND OF THE INVENTION

An increasing number of passenger vehicles manufactured today are equipped with supplemental inflatable restraints for vehicle occupants; these are commonly known as air bags. Currently, the air bag provided for the vehicle driver is mounted in a storage compartment located in the vehicle steering column. The air bag for the front seat passenger is located in a storage compartment located beneath the vehicle dash board.

It is conventional for the steering wheel hub or for the dash board to incorporate a door formed in a decorative panel. This door is normally rectangular and is separate from the surrounding panel area so that it can be swung open by the deploying air bag upon inflation. Some of these air bag doors comprise a portion of the panel defined by a U-shaped tear seam line of weakened panel outer skin material. This outer skin is backed by a continuous layer of foam material which is foamed in situ against the outer skin in a mold. This tear seam line is fractured by the inflating air bag so that the door tears the foam and swings open about a hinge line extending between the ends of the tear line, to enable the air bag to properly deploy.

Unfortunately, this conventional process of foaming the intermediate foam layer against the skin in a mold frequently results in a sagging of the outer skin as the foam contracts slightly upon process completion. This phenomenon is caused by the inconsistent thickness of the outer skin layer. This slight depression is perceptible to vehicle occupants and presents a definite styling drawback, especially in the more expensive vehicles.

It is quite desirable to provide a decorative panel for a vehicle interior which incorporates a door covering the air bag storage compartment that has a seam line that is invisible, or visually imperceptible, to occupants of the vehicle.

SUMMARY OF THE INVENTION

It is therefore an object of this invention to provide a decorative panel for a covering an air bag storage compartment that includes a door defined by an invisible tear seam line in the panel outer skin.

In accordance with this invention, a composite decorative panel for a vehicle interior having a predetermined tear seam line comprises rigid inner layer having discrete surfaces abutting each other along the seam line, a flexible outer layer having a weakened section along the seam line created by a depression on its inner surface, and an intermediate layer of resilient foam having discrete surfaces abutting each other along the seam line. The foam pieces completely fill the void between the inner and outer layers to completely support the outer layer to render the seam line invisible and are adhesively bonded to the inner and outer layers.

In a preferred embodiment, a decorative panel is provided for covering an air bag which is located in a storage compartment in a vehicle interior for deployment outwardly of the panel upon inflation. The panel comprises a thermoplastic inner support layer having discrete surfaces abutting each other along a predetermined U-shaped tear seam line partially framing the opening to define a door in the panel and a flexible vinyl outer skin layer presenting a smooth outer surface and having a weakened section on its inner surface forming the seam line. An intermediate resilient olefin foam or equivalent strength polyurethane foam layer having discrete surfaces abutting each other along the seam line completely fills the void between the inner and outer layers and is adhesively bonded to the inner and outer layers.

With this panel construction, only the outer skin along the seam line needs to be torn by inflation of the air bag, since the inner and foam layers include discrete abutting surfaces along the seam line. Thus, the door more easily breaks loose to pivot open about a hinge line extending between the ends of the seam line to enable deployment of the air bag outwardly of the panel. Another advantage is that the outer skin is completely supported to present a smooth visible surface.

These and other features and advantages will become more readily apparent upon reference to the following detailed description of this invention, as illustrated in the accompanying drawings, wherein:

DETAILED DESCRIPTION OF THE INVENTION

Figure 1:
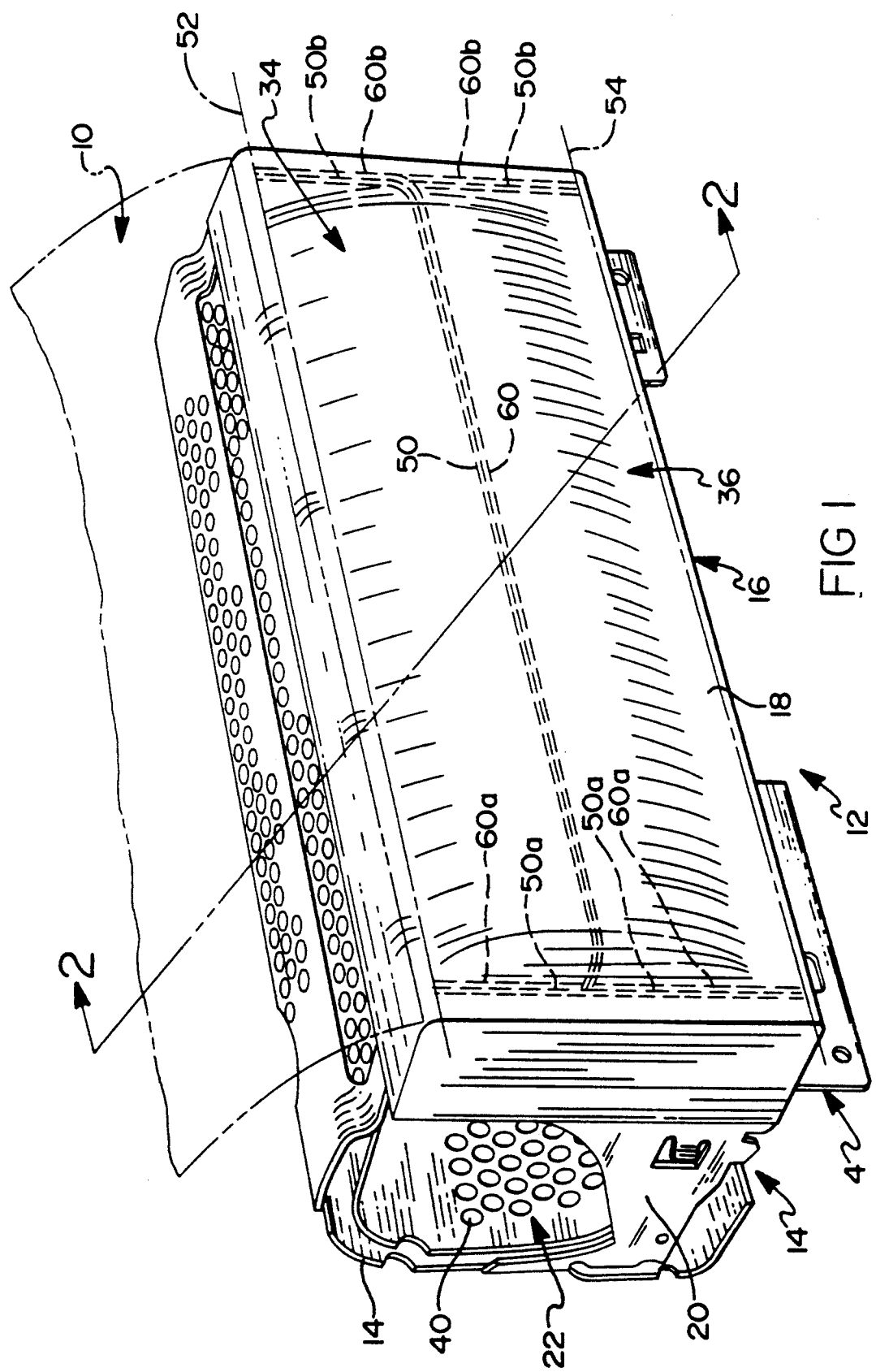
FIG. 1 is a perspective schematic view of a vehicle air bag installation having a decorative cover panel formed in accordance with this invention.

Referring now to FIG. 1 of the drawings, a vehicle dashboard 10 mounts an inflatable air bag assembly 12 beneath its surface. The assembly 12 includes a container 14 that is closed by a decorative panel 16. Panel 16 has an outer skin 18 having a profile matching the outer profile of dashboard 10. The air bag assembly 12 is incorporated into the styling scheme and forms a portion of the dashboard 10 which effectively conceals the air bag.

Figure 2:
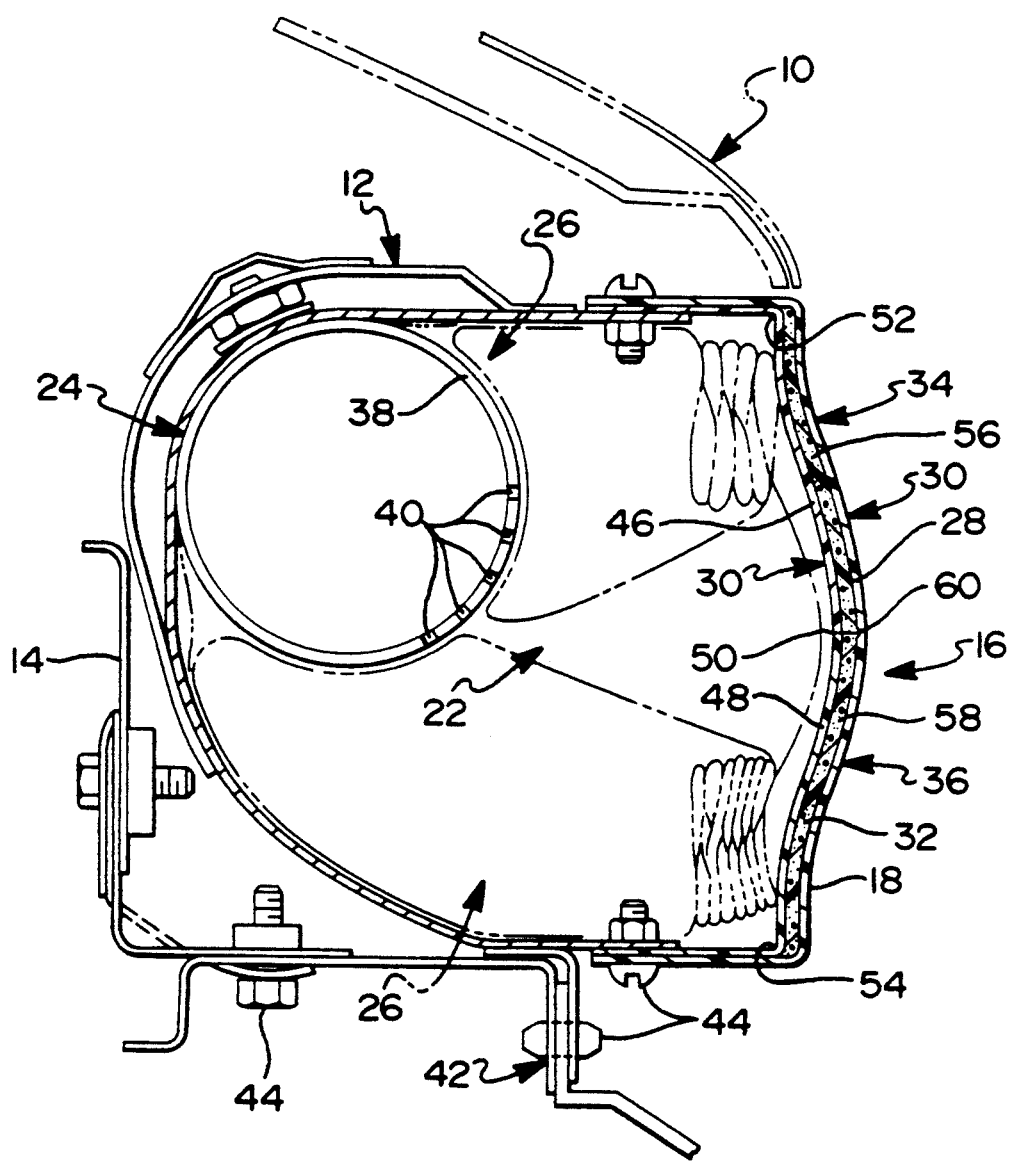
FIG. 2 is a sectional view taken along line 2—2 of FIG. 1.

Referring additionally to FIG. 2, the container 14 is sheet steel and includes walls 20 which define a cavity 22 for receiving a cylindrical gas generator 24 and an inflatable air bag 26. Container 14 has a front opening 28 which is closed by panel 16.

Panel 16 includes the outer skin layer 18, an inner support layer 30, and an intermediate foam layer 32 and comprises upper and lower mating door flaps 34, 36. The detailed construction of panel 16 and door flaps 34 and 36 will be later described.

Gas generator 24 has a cylindrical outer housing 38 containing a plurality of nozzles 40 for directing gas into air bag 26 upon a predetermined vehicle impact, as will be later described. The gas generator illustrated is exemplary only and forms no part of this invention. It may be of any conventional construction.

Assembly 12 is mounted on a dashboard support bracket 42 by any conventional means, such as bolts 44 so that the surface of outer skin 18 lies flush with the surrounding dashboard surface.

Figure 3:
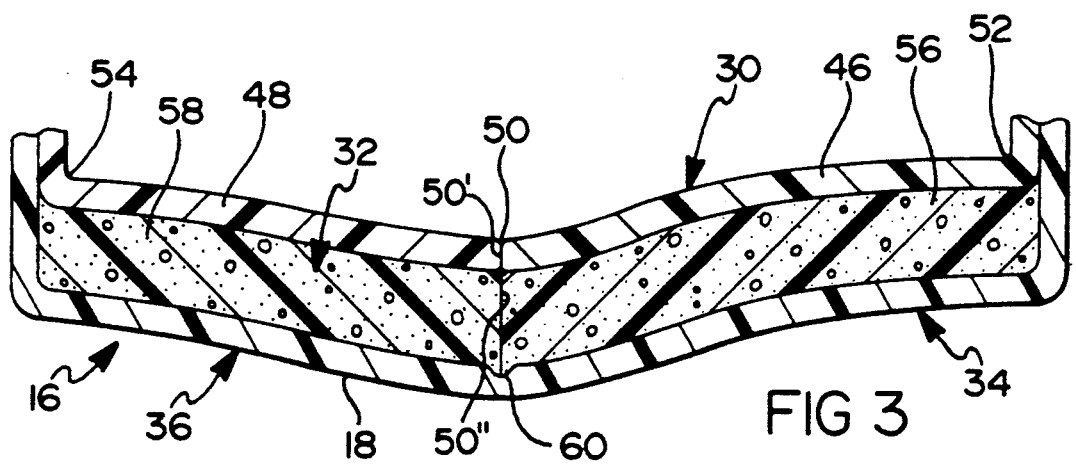
FIG. 3 is a detail view of a portion of FIG. 2, enlarged to better illustrate the details of construction.

The decorative cover panel 16 is of composite construction, as best seen in FIG. 3. The inner support layer 30 actually comprises an upper segment 46 and a lower segment 48 that abut each other along a horizontal parting line 50 and similar vertical lines 50a and 50b. The segments 46 and 48 are preferably made of a rigid thermoplastic material, although they could be made of aluminum.

Upper segment 46 has an upper horizontal slightly reduced section 52 which forms an upper hinge line for this segment. Similarly, lower segment 48 has a lower slightly reduced section 54 which forms a lower hinge line.

The intermediate layer 32 comprises an upper segment 56 and a lower segment 58 which also abut each other along parting lines 50, 50a and 50b. Segments 56 and 58 are made of a resilient foam, preferably an olefin foam or equivalent strength polyurethane foam, which are preferably adhesively bonded to the inner and outer layers 18 and 30.

Outer skin layer 18 is preferably made of a soft, flexible vinyl and, unlike the inner and intermediate layers 30 and 32, is of a single piece of material. However, skin layer 16 contains an H-shaped (or inverted double U-shape)) groove comprising a horizontal portion 60 and spaced vertical portions 60a and 60b on its underside.

It is important that the intermediate foam segments 56 and 58 fully fill and support the groove 60, 60a and 60b. Otherwise, the skin layer 18 would sag perceptibly, marring the smoothness of the dashboard surface. To facilitate vehicle interior styling, it is important that the air bag cover doors be undetectable as such by the vehicle occupants.

These groove portions 60, 60a and 60b are weakened sections of skin layer 16 and define a. frangible tear seam line, as will be later described. The groove portions 60, 60a and 60b are coextensive with parting lines 50, 50a and 50b which together define the two U-shaped door flaps 34 and 36.

Operation of the invention will now be described. When the vehicle experiences a predetermined impact, gas generator 24 will be activated to rapidly direct a pressurized inert gas, such as nitrogen, through nozzles 40 into air bag 26. As air bag 26 inflates, it exerts a rapidly increasing force against cover panel 16. The only resistance to the inflating air bag is provided by continuous skin 18 since the inner and intermediate segments 46, 48 and 56, 58 are unconnected and merely abut each other along discrete unconnected surfaces forming parting lines 50, 50a and 50b. One pair of the discrete unconnected surfaces are representatively shown for parting line 50 in FIG. 3 by reference numerals 50' and 50". The discrete unconnected surfaces 50' and 50" are directly aligned with weakened groove portion 60 as shown in FIG. 3. Thus skin layer 18 will predictably fracture along the predetermined tear seam lines 60, 60a and 60b. This action separates panel 16 into the upper and lower door flaps 34 and 36 which will pivot open about hinge lines 52 and 54 to enable deployment of the inflating air bag into the vehicle interior in a well-known manner. Until actuation of the air bag, the construction of the decorative panel 16 in accordance with this invention effectively conceals the air bag location by unobtrusively blending into the dashboard styling.

I claim:

1. A composite decorative panel cover for a vehicle interior having a predetermined hidden tear seam line overlying an air bag that is inflated in response to vehicle impact comprising:

a rigid inner layer having discrete unconnected surfaces abutting each other along said seam line, said rigid inner layer formed by first and second separate members, each of said separate members having side portions, said cover including a flexible outer layer performed and separate from said rigid inner layer; said flexible outer layer having a weakened section along said seam line created by a depression on its inner surface, said depression directly overlying said discrete unconnected surfaces of said rigid inner layer;

an intermediate layer of resilient foam having discrete unconnected surfaces abutting each other along said seam line and completely filling the void between the inner and outer layers to completely support said outer layer to render said seam line invisible, said unconnected surfaces of said intermediate layer of resilient foam being directly aligned with said discrete unconnected surfaces of said rigid inner layer and also being directly aligned with said depression; whereby said discrete unconnected surfaces of said rigid inner liner and said intermediate layer of resilient foam material will separate without breakage to apply a force against said depression to cause said cover to separate and form an opening for deployment of the airbag therethrough.

2. A decorative panel cover for an air bag which is located in a storage compartment in a vehicle interior for deployment outwardly of the panel upon inflation upon inflation, the cover having a predetermined hidden tear seam line comprising:

said cover having a U-shaped hidden tear seam line partially framing a deployment opening in said cover;

a rigid inner support layer having discrete unconnected surfaces abutting each other along said U-shaped hidden tear seam line, said rigid inner layer formed by first and second separate members, each of said separate members having side portions, said cover including a flexible outer skin layer performed and separate from said rigid inner layer presenting a smooth outer surface and having a weakened section along said seam line on its inner surface, said weakened section directly aligned with said discrete unconnected surfaces of said rigid inner layer;

an intermediate resilient foam layer having discrete unconnected surfaces abutting each other along said seam line, said discrete unconnected surfaces of said intermediate resilient foam layer being directly aligned with said discrete unconnected surfaces of said rigid inner layer and said weakened section also being directly aligned with said discrete unconnected surfaces of said intermediate resilient foam layer, whereby inflation of the air bag tears the outer skin along the seam line to pivot the door open about a hinge line extending between the ends of the seam line to enable deployment of the air bag outwardly of the panel and whereby said discrete unconnected surfaces of said rigid inner liner and said discrete unconnected surfaces of said intermediate layer of resilient foam material will separate without breakage to apply a force against said weakened section to cause said cover to separate and form an opening for deployment of the airbag therethrough.

3. The panel of claim 2, wherein the foam layer is configured to completely fill the void between the inner and outer layers to fully support the outer skin and prevent sagging thereof along said seam line to preserve its invisibility.

4. The panel of claim 2, wherein the intermediate resilient layer is formed of olefin foam or polyurethane foam.

5. The panel of claim 2, wherein the inner support layer is formed of a rigid thermoplastic material.

6. The panel of claim 2, wherein the flexible outer skin is vinyl.

7. A decorative panel cover for an air bag which is located in a storage compartment in a vehicle interior for deployment outwardly of the panel upon inflation, the cover having a predetermined hidden tear seam line and comprising:

said cover having a H-shaped hidden tear seam line partially framing a deployment opening in said cover and defining a pair of mating doors in the cover;

a rigid inner support layer having discrete unconnected surfaces abutting each other along said H-shaped hidden tear seam line, said rigid inner layer formed by first and second separate members, each of said separate members having side portions, said cover including a flexible outer skin layer preformed and separate from said rigid inner layer presenting a smooth outer surface and having a weakened section along said seam line on its inner surface, said weakened section directly overlying said discrete unconnected surfaces of said rigid inner layer;

an intermediate resilient foam layer having discrete unconnected surfaces abutting each other along said seam line, said unconnected surfaces of said intermediate resilient foam layer being directly aligned with said discrete unconnected surfaces of said rigid inner layer and said weakened section also being directly aligned with said discrete unconnected surfaces of said intermediate resilient foam layer, whereby inflation of the air bag tears the outer skin along the seam line to pivot the doors open about a hinge line extending between the ends of the seam line to enable deployment of the air bag outwardly of the panel and whereby said discrete unconnected surfaces of said rigid inner liner and said discrete unconnected surfaces of said intermediate layer of resilient foam material will separate without breakage to apply a force against said weakened section to cause said cover to separate and form an opening for deployment of the airbag therethrough.

8. The panel of claim 7, wherein the foam layer is configured to completely fill the void between the inner and outer layers to fully support the outer skin and prevent sagging thereof along said seam line to preserve its invisibility.

9. The panel of claim 7, wherein the intermediate resilient layer is formed of olefin foam or polyurethane foam.

10. The panel of claim 7, wherein the inner support layer is formed of a rigid thermoplastic material.

11. The panel of claim 7, wherein the flexible outer skin is vinyl.

12. A decorative panel for covering an air bag which is located in a storage compartment in a vehicle interior for deployment outwardly of the panel upon inflation, comprising:

a thermoplastic inner support layer having discrete unconnective surfaces abutting each other along a predetermined H-shaped tear seam line partially framing the opening to define mating doors in the panel, a flexible vinyl outer skin layer presenting a smooth outer surface and having a weakened section along said seam line on its inner surface, and an intermediate resilient olefin or polyurethane foam layer having discrete unconnective surfaces abutting each other along said seam line, said foam layer completely filling the void between the inner and outer layers and being adhesively bonded to the inner and outer layers, whereby inflation of the air bag tears the outer skin along the seam line to pivot the doors open about hinge lines extending between the ends of the seam line to enable deployment of the air bag outwardly of the panel.

* * * * *